United States Patent
Izumi

(10) Patent No.: US 9,070,157 B2
(45) Date of Patent: Jun. 30, 2015

(54) PAYMENT APPARATUS AND EC SERVER

(71) Applicant: DeNA Co., Ltd., Tokyo (JP)

(72) Inventor: Yusuke Izumi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/037,520

(22) Filed: Sep. 26, 2013

(65) Prior Publication Data

US 2015/0046293 A1  Feb. 12, 2015

(30) Foreign Application Priority Data

Aug. 8, 2013 (JP) ................. 2013-165458

(51) Int. Cl.
*G06Q 30/00* (2012.01)
*G06Q 30/06* (2012.01)

(52) U.S. Cl.
CPC .......... *G06Q 30/0635* (2013.01); *H05K 999/00* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

2011/0258085 A1* 10/2011 Kane et al. ................... 705/27.1

FOREIGN PATENT DOCUMENTS

| JP | 2001-117995 | 4/2001 |
| JP | 2002-259839 | 9/2002 |
| JP | 2002-304586 | 10/2002 |
| JP | 2008-026935 | 2/2008 |

OTHER PUBLICATIONS

Japanese Office Action mailed Nov. 26, 2013.

* cited by examiner

*Primary Examiner* — Ethan D Civan
(74) *Attorney, Agent, or Firm* — IPUSA, PLLC

(57) ABSTRACT

A payment apparatus that settles merchandise sold at an EC site, includes a receiving unit that receives, when a merchandise page of the EC site is accessed by a user, a merchandise identifier for specifying the merchandise and session data with the user from the merchandise page; a generation unit that generates a payment icon including information regarding a payment of the merchandise based on the merchandise identifier and the session data; a sending unit that sends the payment icon to the merchandise page; and a payment unit that performs, when the payment icon displayed in the merchandise page is operated by the user, a payment process of the merchandise for the user specified by the session data.

5 Claims, 14 Drawing Sheets

FIG.4

SESSION MANAGEMENT DB

| SESSION ID | USER ID | LAST LOG-IN DATE |
|---|---|---|
| fsfsegsegt | user00001 | 2013/7/1 10:23 |
| eererewffe | user00003 | 2013/7/1 12:01 |
| : | : | : |

FIG.5

EC SITE/MERCHANDISE DB

| EC SITE ID | EC SITE (URL) | SELLING TRADER | MERCHAN-DISE ID | MERCHANDISE NAME | MERCHANDISE MODEL NUMBER | PRICE |
|---|---|---|---|---|---|---|
| EC00001 | http://www.aaa.com | AAA | A001 | HEADPHONE | HED-100 | ¥50,000 |
|  |  |  | A002 | HEADPHONE | HED-101 | ¥49,800 |
|  |  |  | A003 | HEADPHONE | HED-102 | ¥19,800 |
| EC00002 | http://www.bbb.com | BBB | B001 | WALLET | WAL132 | ¥14,500 |
|  |  |  | .. | .. | .. | .. |
| EC00003 | http://www.ccc.com | CCC | C001 | GAME SOFTWARE | soft ver1.002 | ¥520 |
| .. | .. | .. | .. |  |  | .. |
| .. | .. | .. | .. |  |  |  |

FIG.6

USER DB

| USER ID | LOG-IN PASSWORD | NAME | AGE | ADDRESS | CREDIT CARD INFORMATION |
|---|---|---|---|---|---|
| user00001 | xxxx | TARO YAMADA | 38 | Minato-ku, Tokyo··· | xxxxxxxxxx |
| user00002 | xxxx | HANAKO TANAKA | 25 | Chuo-ku, Tokyo··· | xxxxxxxxxx |
| user00003 | xxxx | ICHIRO SUZUKI | 56 | Setagaya-ku, Tokyo··· | xxxxxxxxxx |
| ·· | | ·· | ·· | ·· | ·· |

FIG.8 http://www.xxx.com/manage/login-AAA/

MANAGEMENT SCREEN FOR MEMBER STORE

WELCOME
AAA

●MERCHANDISE REGISTRATION

MERCHANDISE ID: A001

MERCHANDISE NAME: HEADPHONE

MERCHANDISE MODEL NUMBER: HED-100

PRICE: 50,000 yen

SCRIPT TAG

<script src="https://www.xxx.com/script/a40KfkoSWPkaWd8fpE"></script> — 101

☆PLEASE EMBED SCRIPT TAG IN MERCHANDISE PAGE BY COPY AND PASTE

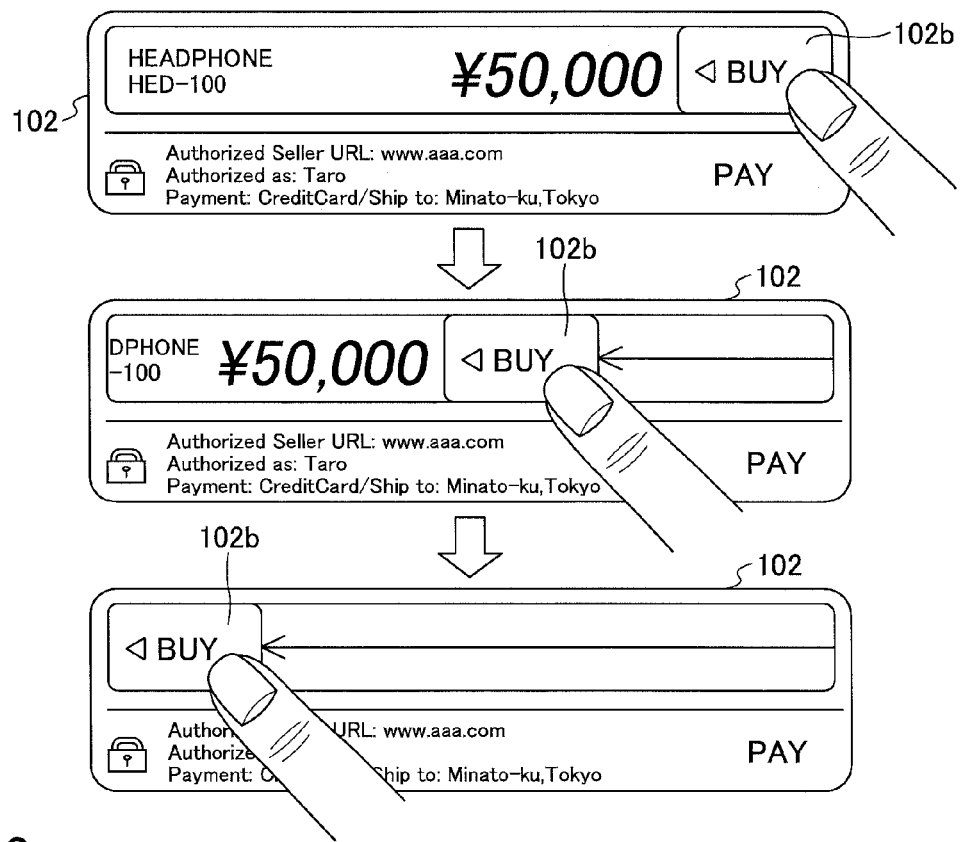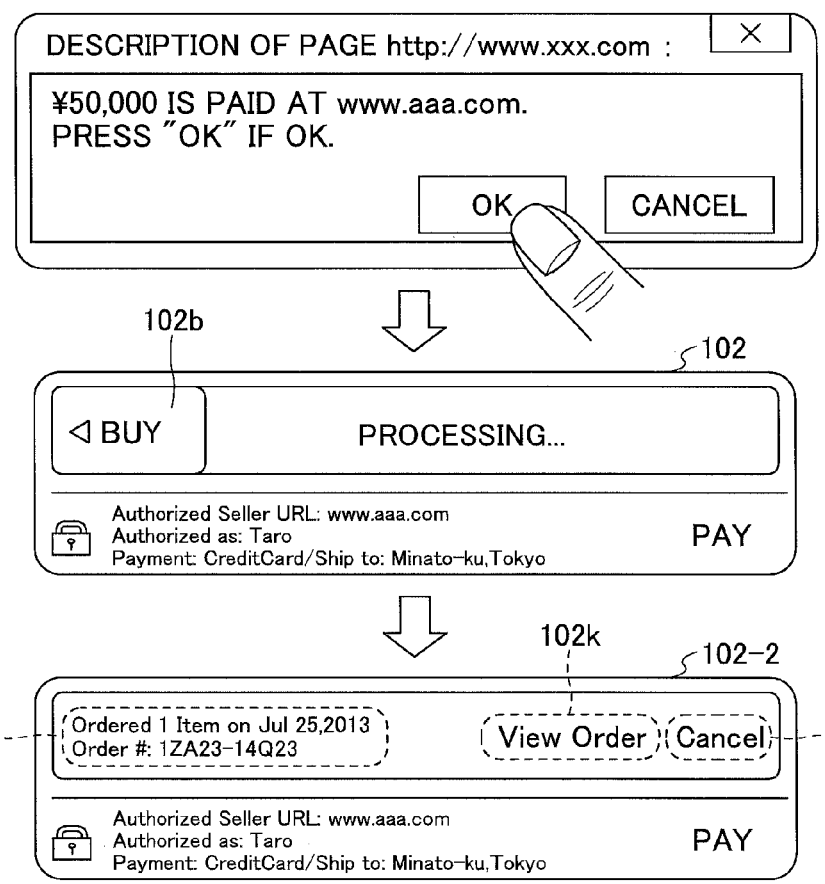
FIG.12

PAYMENT APPARATUS AND EC SERVER

CROSS-REFERENCE TO RELATED APPLICATION

The present application is based on and claims the benefit of priority of Japanese Priority Application No. 2013-165458 filed on Aug. 8, 2013, the entire contents of which are hereby incorporated by reference.

BACKGROUND OF THE INVENTION

1. Field of the Invention

The present invention relates to a payment apparatus and an EC server.

2. Description of the Related Art

Recently, internet shopping has become wide spread. Selling traders sell merchandise or the like to users by operating web sites so-called Electronic Commerce (EC) sites. Here, in order to increase conveniences for users, the EC site sides need to correspond to various payment methods for the users to pay for the purchased merchandise such as bank transfer, credit card payment, payment at convenience stores, prepaid payment or the like, for example. Generally, it is a main stream for the selling traders to use external settlement substituting services because there is a problem of development costs or a technical problem in introducing a payment mechanism in the EC sites by themselves (see Patent Documents 1-3, for example).

For example, there is a type so-called an "ASPlink type" (for small EC sites) in which a payment screen is provided to the EC site. With this type, selling traders can easily introduce a settlement system with a low price just by setting a link to a payment screen site operated by a settlement substituting trader side in their own EC site of own.

Further, for example, there is a type so-called a "module embedded type" (for large to middle EC sites) in which a settlement system such as a shopping cart or the like is provided as a component in a manner that the settlement system is capable of being embedded in EC sites of the selling traders. The selling traders can complete a purchase to a payment in their own domains, or can produce design uniformity as the settlement system can be embedded in their own EC sites.

However, in the above described "ASPlink type" and the "module embedded type", a plurality of screen transitions are necessary until the completion of the payment when a user purchases merchandise or the like and pays for it. Thus, there is a problem that an operation of the user in processes until the completion of the payment becomes troublesome, in particular, when a user uses a smartphone or the like. Further, in accordance with this problem, conversion rate (CVR) may be lowered.

PATENT DOCUMENTS

[Patent Document 1] Japanese Laid-open Patent Publication No. 2008-026935
[Patent Document 2] Japanese Laid-open Patent Publication No. 2002-304586
[Patent Document 3] Japanese Laid-open Patent Publication No. 2002-259839

SUMMARY OF THE INVENTION

The present invention is made in light of the above problems, and provides a payment mechanism in which usability in processes to a payment is improved.

According to an embodiment, there is provided a payment apparatus that settles merchandise sold at an EC site, includes a receiving unit that receives, when a merchandise page of the EC site is accessed by a user, a merchandise identifier for specifying the merchandise and session data with the user from the merchandise page; a generation unit that generates a payment icon including information regarding a payment of the merchandise based on the merchandise identifier and the session data; a sending unit that sends the payment icon to the merchandise page; and a payment unit that performs, when the payment icon displayed in the merchandise page is operated by the user, a payment process of the merchandise for the user specified by the session data.

BRIEF DESCRIPTION OF THE DRAWINGS

Other objects, features and advantages of the present invention will become more apparent from the following detailed description when read in conjunction with the accompanying drawings.

FIG. 4 is a view illustrating an example of a data structure of a session management DB 205a;
FIG. 5 is a view illustrating an example of a data structure of an EC site/merchandise DB 205b;
FIG. 6 is a view illustrating an example of a data structure of a user DB 205c;
FIG. 8 is a view illustrating an example of a management screen for registering merchandise;
FIG. 12 is a view (first) illustrating an example of a payment operation.

DETAILED DESCRIPTION OF THE PREFERRED EMBODIMENTS

Figure 1:
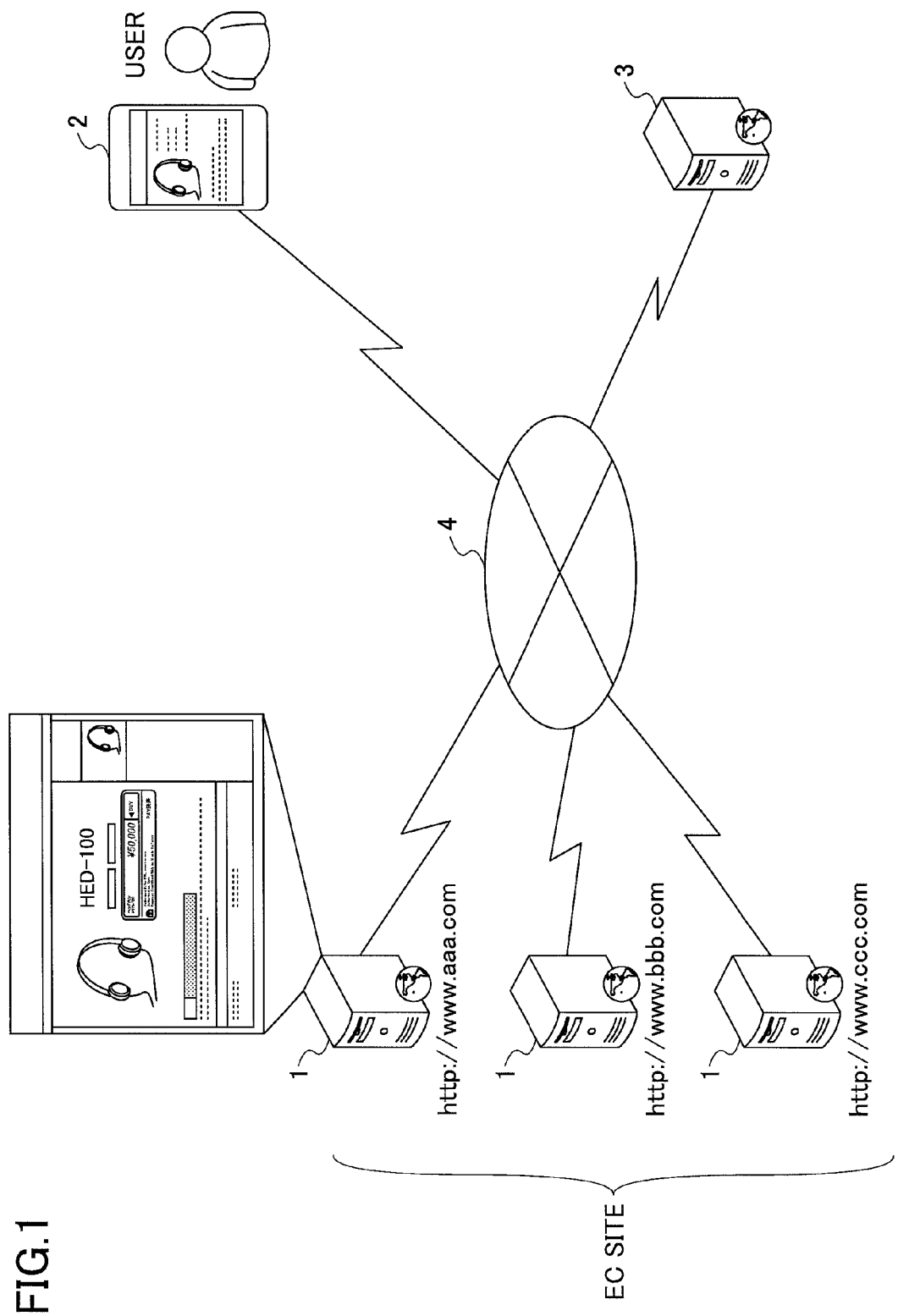
FIG. 1 is a view illustrating an example of a network structure of a payment system.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(System Structure)
(Network)

FIG. 1 is a view illustrating an example of a network structure of a payment system of the embodiment. In FIG. 1, in the payment system, EC servers 1, a user terminal 2 and a payment server 3 are connected with each other via a network 4.

The EC server 1 is a web server of an EC site operated by a selling trader. The selling trader presents web contents regarding merchandise or the like (hereinafter, simply referred to as "merchandise") that the selling trader would like to sell on the EC server 1, and sells the merchandise to users. Here, the EC site of the embodiment uses an external settlement substituting service by way of an embodiment in which a script tag provided by a settlement substituting trader is embedded in a merchandise page (web page) of the EC site, in a payment of a purchased merchandise (which will be explained later in detail).

The user terminal 2 is a computer terminal used by a user such as, for example, a smartphone, a tablet terminal, a personal computer, a mobile phone or the like. The user accesses the EC site using the user terminal 2 and purchases merchandise sold (presented) in the merchandise page of the EC site.

The payment server 3 is a payment server operated by a payment trader (a settlement substituting trader). In a payment of purchased merchandise by a user, when a payment icon in the merchandise page of the EC site is operated, the payment server 3 receives the operation and performs a payment process in accordance with the purchase of the merchandise.

The network 4 is a wired or wireless network and may be the INTERNET, for example, that connects the EC servers 1, the user terminal 2 and the payment server 3 with each other. Further, the user terminal 2 and the network 4 may be connected via 3G, 4G, WiFi (registered trademark) or the like.
(Hardware)

Figure 2:
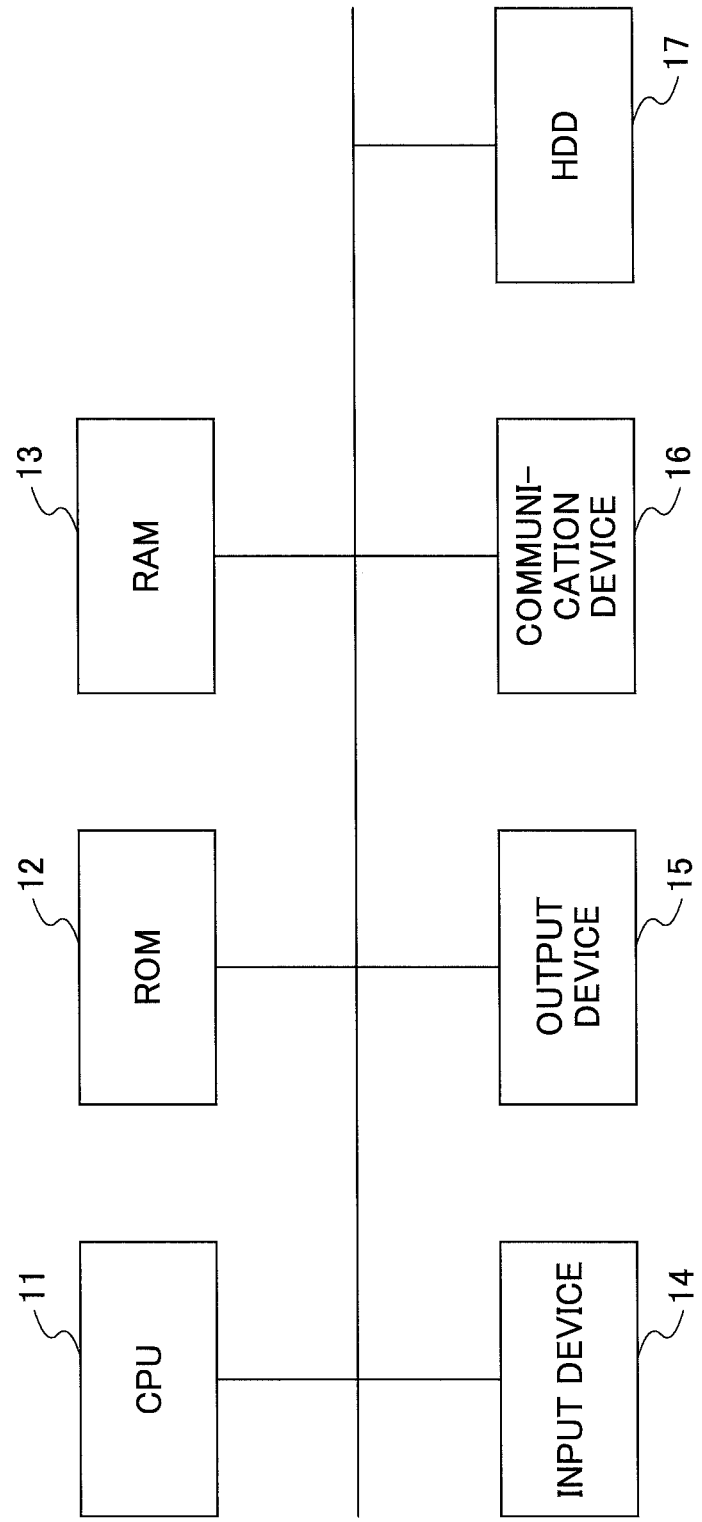
FIG. 2 is a view illustrating an example of a hardware structure of a payment server 3.

FIG. 2 is a view illustrating an example of a hardware structure of the payment server 3 of the embodiment. In FIG. 2, the payment server 3 includes a CPU (Central Processing Unit) 11, a ROM (Read Only Memory) 12, a RAM (Random Access Memory) 13, an input device 14, an output device 15, a communication device 16 and a HDD (Hard Disk Drive) 17.

The CPU 11 executes various programs or performs an arithmetic process. The ROM 12 stores programs necessary in activation or the like. The RAM 13 temporarily stores a process by the CPU 11 or stores data. The input device 14 is a keyboard or a mouse. The output device 15 is a display that outputs a video or an image to be displayed, or a speaker that outputs audio or the like. The communication device 16 performs a communication with other devices via the network 4. The HDD 17 stores various data and programs.
(Function)

Figure 3:
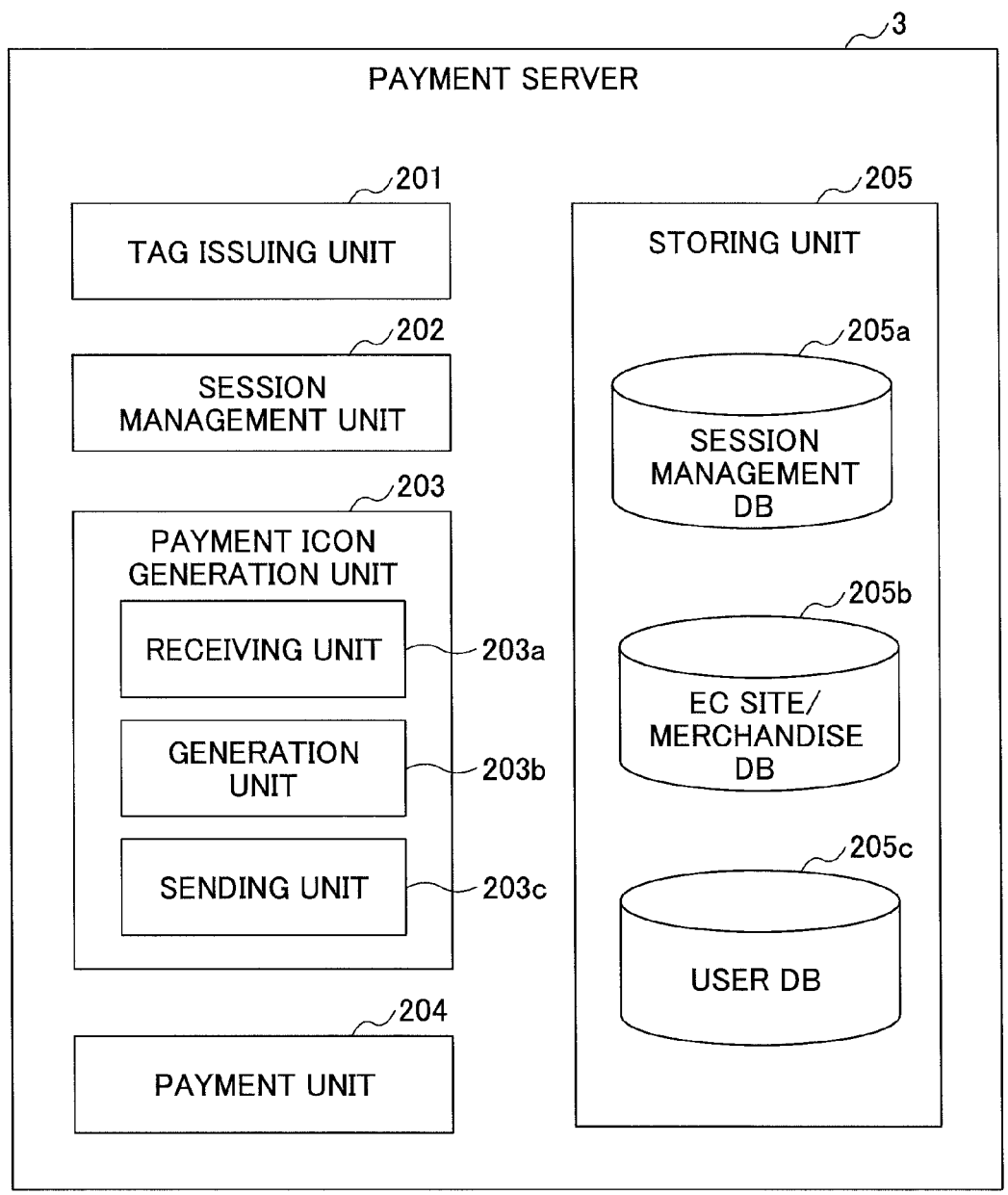
FIG. 3 is a view illustrating an example of a functional structure of the payment server 3.

FIG. 3 is a view illustrating an example of a functional structure of the payment server 3 of the embodiment. In FIG. 3, the payment server 3 includes a tag issuing unit 201, a session management unit 202, a payment icon generation unit 203, a payment unit 204 and a storing unit 205.

The tag issuing unit 201 issues a script tag for each merchandise. The issued script tag is embedded in a merchandise page (web page) of the EC site. With this, a payment icon is generated at timing when the merchandise page is accessed by a user.

The session management unit 202 issues session ID to the user terminal 2 of the user when the user performs a user log-in in a member screen of the payment server 3. Then, the session management unit 202 performs a session management with a log-in user by managing the issued session ID.

The payment icon generation unit 203 includes a receiving unit 203a, a generation unit 203b and a sending unit 203c, for generating a payment icon.

The receiving unit 203a receives a merchandise identifier (for example, merchandise ID) for specifying merchandise and session data (for example, session ID) of the user who accessed a merchandise page from the merchandise page of the EC server 1 that sells the merchandise.

The generation unit 203b generates a payment icon (for example, a payment banner) including data regarding a payment of the merchandise based on the merchandise identifier of the merchandise and the session data with the user received by the receiving unit 203a.

The sending unit 203c sends the payment icon generated by the generation unit 203b to the merchandise page of the EC server 1. The payment icon is displayed in the merchandise page of the EC server 1 as an image of a banner for the payment of a merchandise price, for example. A specific example will be explained later.

When the payment icon displayed in the merchandise page of the EC server 1 is operated, the payment unit 204 receives the operation as a payment request, and performs a payment process of the merchandise for the user specified by the session data. With this, the merchandise payment (purchase of the merchandise) for the user is completed. Then, after the completion of the merchandise payment, the settlement substituting trader operating the payment server 3 pays the merchandise price to the EC site and the EC site sends the purchased merchandise to the user.

The storing unit 205 includes (stores) a session management DB 205a, an EC site/merchandise DB 205b and a user DB 205c.

The session management DB 205a is a database for performing a session management with log-in users. For example, when a user log-in from a member screen of the settlement substituting service is succeeded, the log-in user and the session ID issued for the log-in user are managed in correspondence with each other in the session management DB 205a.

The EC site/merchandise DB 205b is a database in which EC sites (selling traders) joined to the settlement substituting service provided by the payment server 3 are registered. For example, information of joined EC sites, merchandise sold by the EC sites or the like are previously registered.

The user DB 205c is a database in which users (purchasers) joined to the settlement substituting service provided by the payment server 3 are registered. For example, information of the users, information of credit cards used in a payment or the like are previously stored.

These functional units are actualized by computer programs executed on hardware resources such as the CPU 11, the ROM 12, the RAM 13 or the like of the computer composing the payment server 3. Here, these functional units may be alternately referred to as "means", "modules", "units" "circuits" or the like.

Further, these functional units are not necessarily provided on a single computer, and may be distributed in accordance with necessity. Further, for example, the database or the like systematically stores predetermined data on a recording medium such as a HDD or the like in the server/computer, but is not necessarily provided in a single server and may be provided in a plurality of devices or another device.
(Session Management DB 205a)

FIG. 4 is a view illustrating an example of a data structure of the session management DB 205a of the embodiment. The session management DB 205a manages a log-in user who is at a log-in status and session ID of the user in a correspondent manner. Specifically, the session management DB 205a includes data of "session ID", "user ID" and "last log-in date".

The "session ID" is session ID to be corresponded with user ID of a user succeeded in a user log-in. When a user performs a user log-in from a member screen of the settlement substituting service, session ID is issued in correspondence with the user.

The "user ID" is ID of a user succeeded in a user log-in from the member screen of the settlement substituting service. The "user ID" corresponds to "user ID" of the user DB 205c.

The "last log-in date" is log-in date on which the user log-in is last succeeded.

Here, for example, when the user logs out, a predetermined period has past since the "last log-in date" or the like and the user is not at the log-in status, records of the "session ID", the "user ID" and the "last log-in date" of the user are deleted from the session management DB 205a. Further, in addition to above, for example, the session management DB 205a may manage "IP address", "used browser name" or the like, and may confirm about security whether there is no concern in a payment request.

(EC Site/Merchandise DB 205b)

FIG. 5 is a view illustrating an example of a data structure of the EC site/merchandise DB 205b of the embodiment. In the EC site/merchandise DB 205b, information of EC sites joined to the settlement substituting service, information of merchandise sold at the EC sites or the like are previously registered. Specifically, the EC site/merchandise DB 205b includes data of "EC site ID", "EC site (URL)", "selling trader", "merchandise ID", "merchandise name", "merchandise model number" and "price".

The "EC site ID" is ID allocated at an EC site registration and is a unique identifier for identifying an EC site.

The "EC site (URL)" is a URL (Uniform Resource Locator) of the EC site.

The "selling trader" is name of a seller who operates the EC site and sells the merchandise at the EC site.

The "merchandise ID" is unique identifier for identifying the merchandise sold at the EC site. The merchandise ID is allocated to each merchandise when the merchandise sold at the EC site is registered by the selling trader.

The "merchandise name" is name of the merchandise sold at the EC site by the selling trader.

The "merchandise model number" is a model number of the merchandise sold at the EC site by the selling trader.

The "price" is a price of the merchandise sold at the EC site by the selling trader.

Here, the "merchandise ID", the "merchandise name", the "merchandise model number" and the "price" are registered and updated every time the selling trader registers the merchandise.

(User DB 205c)

FIG. 6 is a view illustrating an example of a data structure of the user DB 205c of the embodiment. In the user DB 205c, information of member users joined to the settlement substituting service, information of credit cards used in a payment or the like are previously stored.

Specifically, the user DB 205c includes data of "user ID", "log-in password", "name", "age", "address" and "credit card information".

The "user ID" is ID allocated at a member user registration and is a unique identifier for identifying a member user.

The "log-in password" is a password used at a user log-in. As will be described later, the user previously logs-in from the member screen of the payment server 3 using the "user ID" and the "log-in password" to retain the log-in status (retain the session with the payment server 3) in payment.

The "name" is a name of the member user.

The "age" is an age of the member user.

The "address" is an address of the member user. The "address" may be used as a default receiver's address of merchandise.

The "credit card information" is information of a credit card of the member user such as a kind, a card number, an expiration date, a card nominee or the like of the credit card. This information is used in a credit card payment when purchasing merchandise.

Here, above described data can be registered and updated by the user from the member screen.

(Flows to Payment Process)

Next, flows to the payment process at the merchandise page of the EC site are explained by three situations (1) to (3).

(1) Preparation at EC site (selling trader) side

Figure 7:
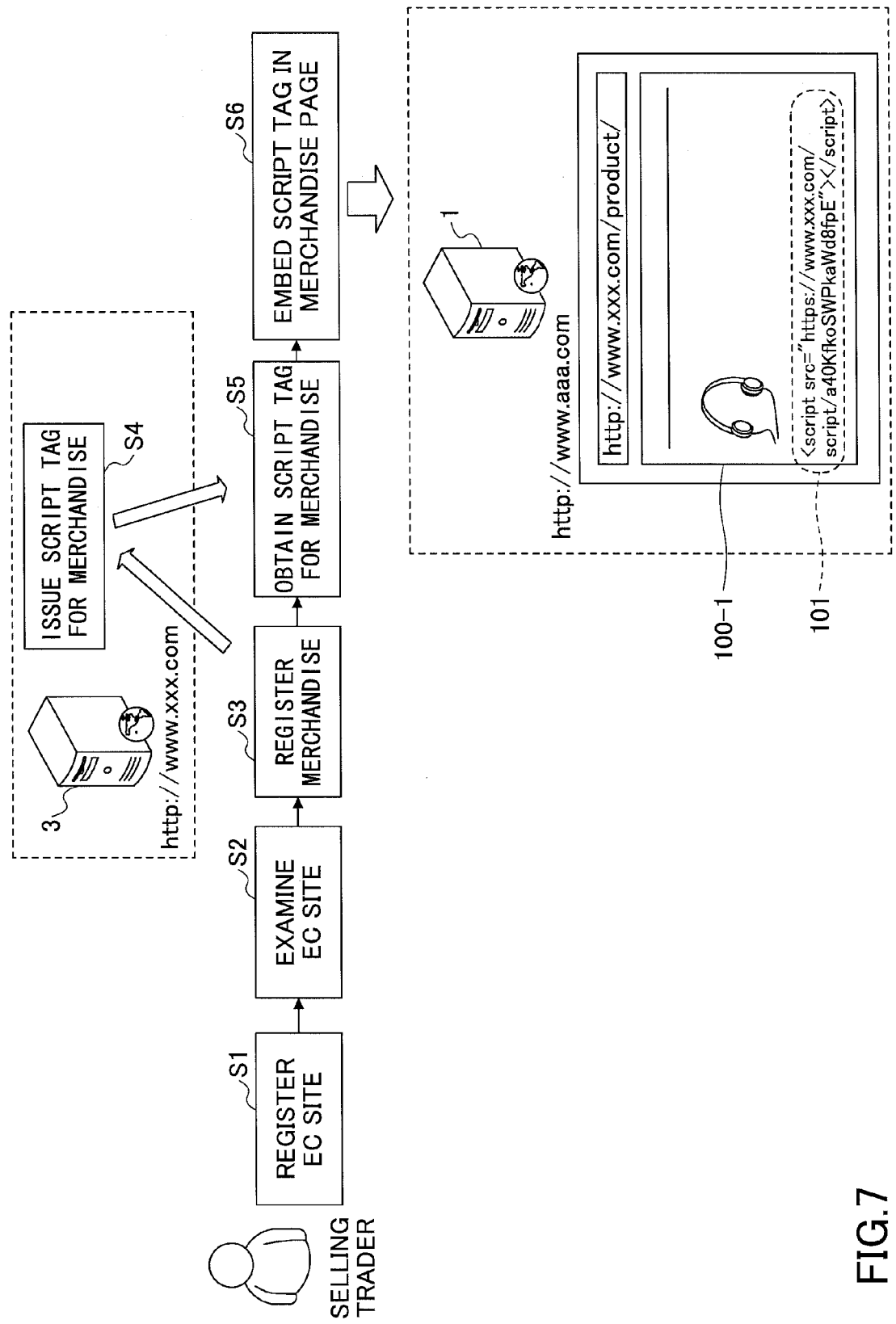
FIG. 7 is a view for explaining a preparation at an EC site (a selling trader) side.

FIG. 7 is a view for explaining a preparation at the EC site (selling trader) side of the embodiment.

S1: First, the selling trader accesses a settlement substituting service site provided by a settlement substituting trader, for example, and registers an EC site. Here, although it is assumed that the settlement substituting service site is provided by the payment server 3, alternatively, a customized settlement substituting service site/server may be provided.

S2: The settlement substituting trader examines whether to permit a join of the EC site (the selling trader). When the settlement substituting trader permits the join of the EC site (the selling trader) the settlement substituting trader registers information of the EC site to the "EC site ID", the "EC site (URL)" and the "selling trader" of the EC site/merchandise DB 205b (see FIG. 5, for example).

S3: Next, when the join is permitted, the selling trader registers merchandise sold at the EC site. For the registering merchandise, the "merchandise ID", the "merchandise name", the "merchandise model number" and the "price" are registered in the EC site/merchandise DB 205b (see FIG. 5, for example). Here, as merchandise are registered one by one, the selling trader may register its merchandise from a management screen for a member store.

S4: When the merchandise are registered by the selling trader, the payment server 3 (the tag issuing unit 201) issues a script tag 101 for each of the merchandise. The script tag 101 may be automatically issued from the management screen every time the merchandise is registered.

S5: The selling trader obtains the script tag 101 for each of the registered merchandise. Here, the script tag 101 is automatically issued and displayed on the management screen every time the merchandise is registered. Thus, the selling trader copies it.

FIG. 8 is a view illustrating an example of a management screen for registering merchandise according to the embodiment. As illustrated, the script tag 101 as described in the following is issued, for example, by registering the merchandise.

<script
src="https://www.xxx.com/script/a40KfkoSWPka
  Wd8fpE"
></script>

Here, the script tag 101 includes at least information for specifying the merchandise ("merchandise ID", for example) at a part of the parameter "a40KfkoSWPkaWd8fpE" (encrypted), for example.

S6: The selling trader embeds the script tag obtained for the registered merchandise in a merchandise page 100-1 in which the merchandise is sold in their own EC site. Specifically, the selling trader copies the script tag 101 automatically issued and displayed in the management screen, and pastes it in a HTML description in the merchandise page, for example. After completing the above processes, the selling trader publically opens the merchandise page in the own EC site.

(2) Preparation at User Site

Figure 9:
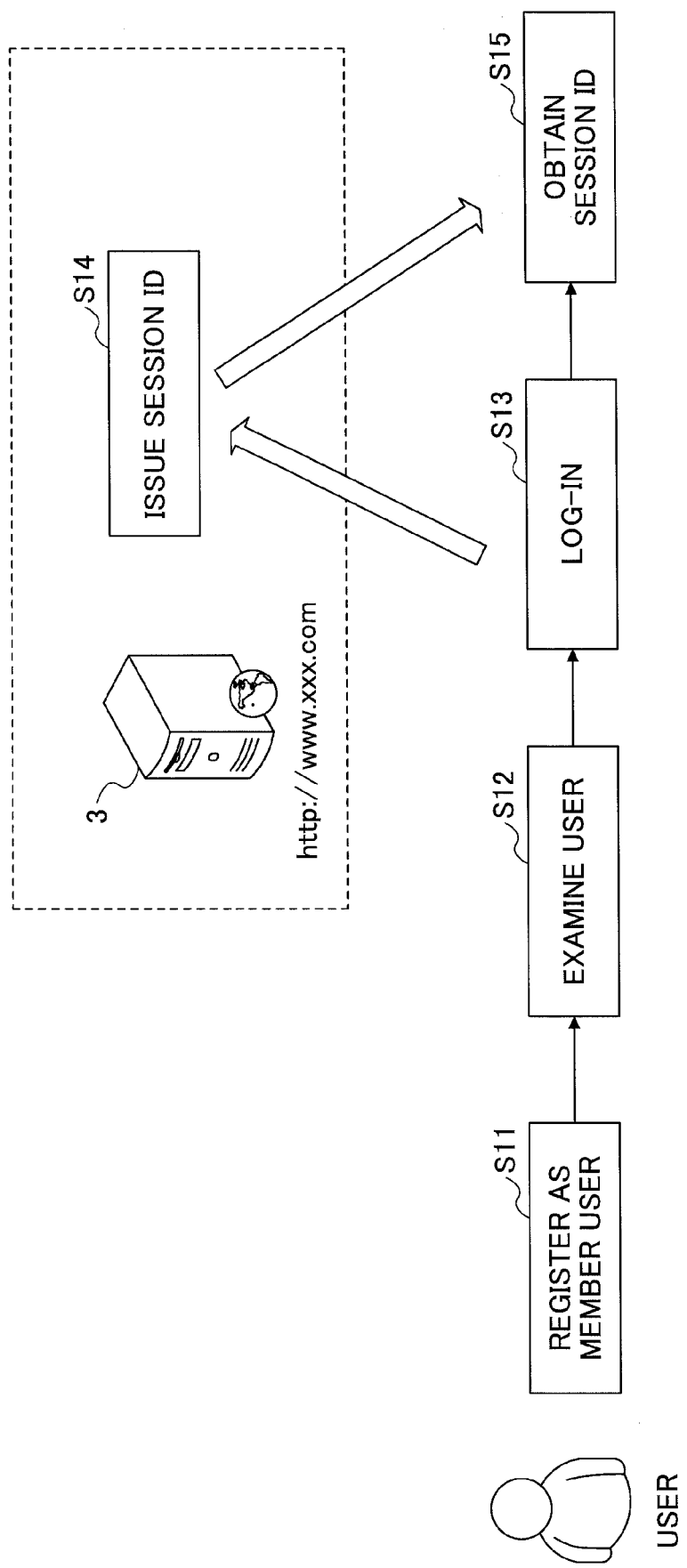
FIG. 9 is a view for explaining a preparation at a user side.

FIG. 9 is a view for explaining a preparation at a user side of the embodiment.

S11: First, the user accesses the settlement substituting service site provided by the settlement substituting trader, for example, and registers as a member user.

S12: The settlement substituting trader examines whether to permit a join of the user. The examination includes examination of a credit card or the like. When the settlement substituting trader permits the join of the user, the settlement substituting trader registers information of the user to the "user ID", the "log-in password", the "name", the "age", the "address" and the "credit card information" of the user DB 205c (see FIG. 6, for example).

S13: The user performs a user log-in in the member screen of the payment server 3. For the log-in, the "user ID" and the "log-in password" the same as those registered in the user DB 205c are required. One-time password or a plurality of passwords may be used for strengthening the security.

S14: When the user performs the user log-in, the payment server 3 (the session management unit 202) issues session ID to the user terminal 2 of the user. The payment server 3 manages the log-in user and the session ID using the session management DB 205a (see FIG. 4, for example).

S15: When the user performs the user log-in in the member screen of the payment server 3, the payment server 3 issues session ID to the user terminal 2 of the user. The user terminal 2 of the user stores the session ID as cookie data of a web browser, for example. After completing the above processes, the user can perform the payment by a simple operation when purchasing merchandise from a merchandise page of an EC site.

(3) Payment Process

Figure 10:
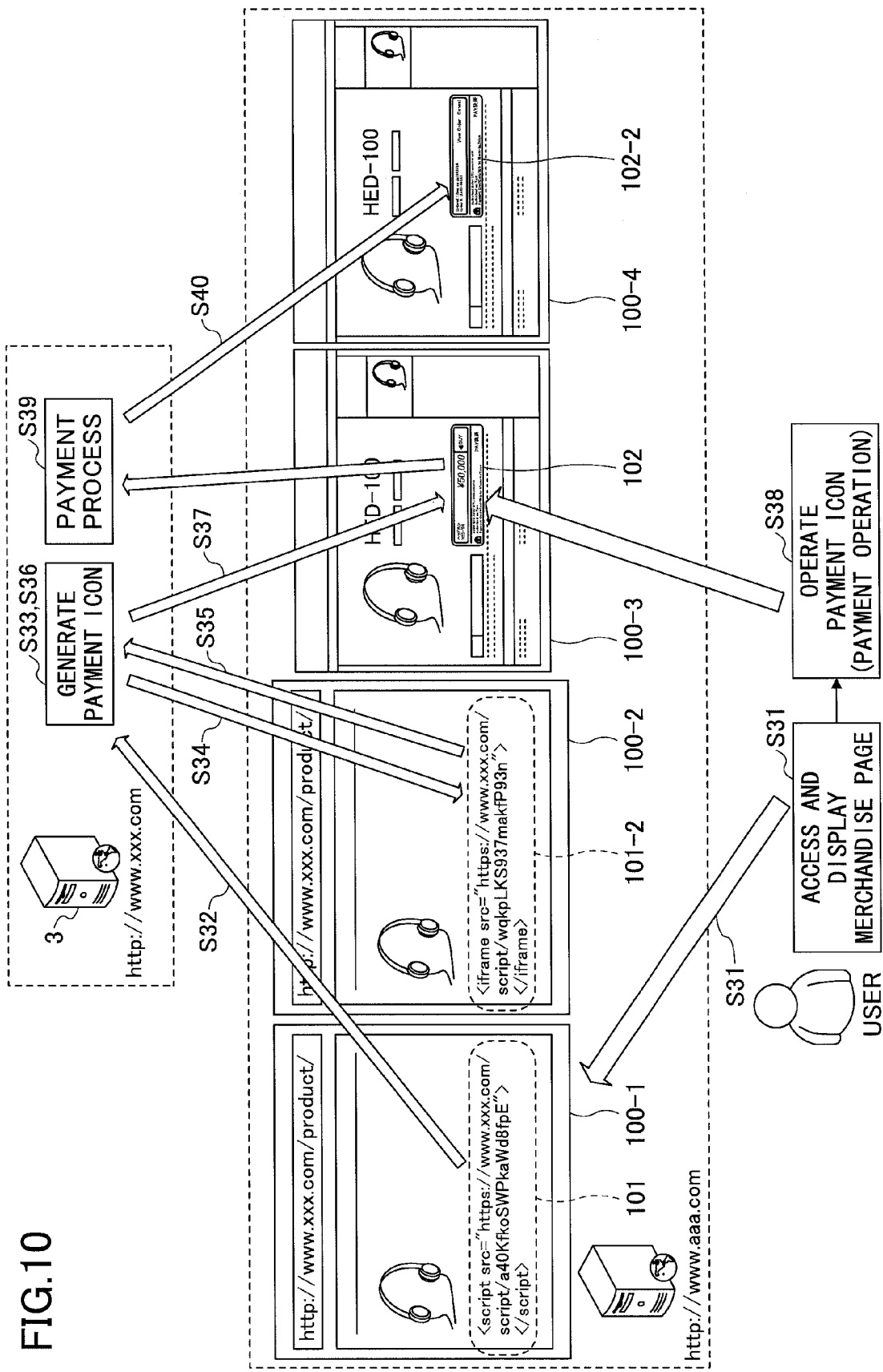
FIG. 10 is a view illustrating an example of a payment process.

FIG. 10 is a view for explaining a payment process of the embodiment.

S31: A user accesses the EC server 1 (the URL of a merchandise page 100-1) using the user terminal 2. At this time, the session ID of the user terminal 2 is sent to the EC server 1.

S32: When the merchandise page 100-1 is accessed from the user terminal 2, first, the EC server 1 loads a script in accordance with the script tag 101 embedded in the merchandise page 100-1 when a JavaScript (registered trademark) or the like is activated. Further, at this time, the merchandise ID in the parameter of the script tag 101 and the session ID of the user terminal 2 are sent to the payment server 3.

S33: Upon receiving a script load request and the session ID from the EC server 1, the payment server 3 (the payment icon generation unit 203) refers to the EC site/merchandise DB 205b and specifies the EC site and the merchandise from the "merchandise ID" in the parameter of the script tag 101. Further, the payment server 3 (the payment icon generation unit 203) refers to the session management DB 205a and specifies the user (user ID) of the user terminal 2 from the received session ID.

Here, when the EC site and the merchandise cannot be specified, the payment server 3 responses with an error. Further, when the user (user ID) cannot be specified, the payment server 3 may prompt the user for a member user registration by responding with a link to the settlement substituting service site provided by the settlement substituting trader (see S11 in FIG. 9).

Upon specifying the EC site, the merchandise and the user, the payment server 3 (the payment icon generation unit 203) generates an iframe tag (inline frame tag) 101-2 as described as follows, for example.
<iframe src="https://www.xxx.com/script/wqkpLKS937makfP93n"></iframe>

Here, the iframe tag 101-2 includes at least information for specifying the merchandise ("merchandise ID", for example) and confirmation information indicating the iframe tag generated by being called by the script tag 101 at a part of the parameter "wqkpLKS937makfP93n" (encrypted), for example.

S34: The payment server 3 (the payment icon generation unit 203) sends the generated iframe tag 101-2 to the EC server 1 (a merchandise page 100-2). With this, the iframe tag 101-2 is once embedded in the merchandise page 100-2.

S35: When the iframe tag 101-2 is embedded in the merchandise page 100-2, the EC server 1 then loads a payment icon that is to be displayed in an inline frame in accordance with the iframe tag 101-2 embedded in the merchandise page 100-2. Further, at this time, the session ID of the user terminal 2 is sent to the payment server 3.

S36: Upon receiving a payment icon load request and the session ID from the EC server 1, first, the payment server 3 (the payment icon generation unit 203) refers to the EC site/merchandise DB 205b, and specifies the EC site and the merchandise from the "merchandise ID" in the parameter of the iframe tag 101-2. Further, the payment server 3 (the payment icon generation unit 203) refers to the session management DB 205a, and specifies the user (user ID) of the user terminal 2 from the received session ID. Further, the payment server 3 (the payment icon generation unit 203) confirms that the iframe tag 101-2 is generated by being called by the script tag 101 and it is before an expiration date since the generation of the iframe tag 101-2 based on the confirmation information. This confirmation is performed to prevent a case that only the iframe tag 101-2 is copied and used at an improper EC site (of a non-member store).

Upon specifying the EC site, the merchandise and the user, the payment server 3 (the payment icon generation unit 203) generates a payment icon 102 corresponding to the specified EC site, the merchandise and the user.

S37: The payment server 3 (the payment icon generation unit 203) sends the generated payment icon 102 to the EC server 1 (a merchandise page 100-3).

In the EC server 1, when <iframe> is used in the merchandise page 100-2, an inline frame having a format that is independently displayed in a window is generated. Further, data obtained by referring to a link destination designated by src is displayed in the inline frame. As a result, the payment icon 102 corresponding to the link destination designated by src is displayed in the inline frame of the merchandise page 100-3.

As such, when the merchandise page 100-1 is accessed by the user terminal 2, the EC server 1 finally has the web browser of the user terminal 2 display the merchandise page 100-3 including the payment icon 102.

Figure 11:
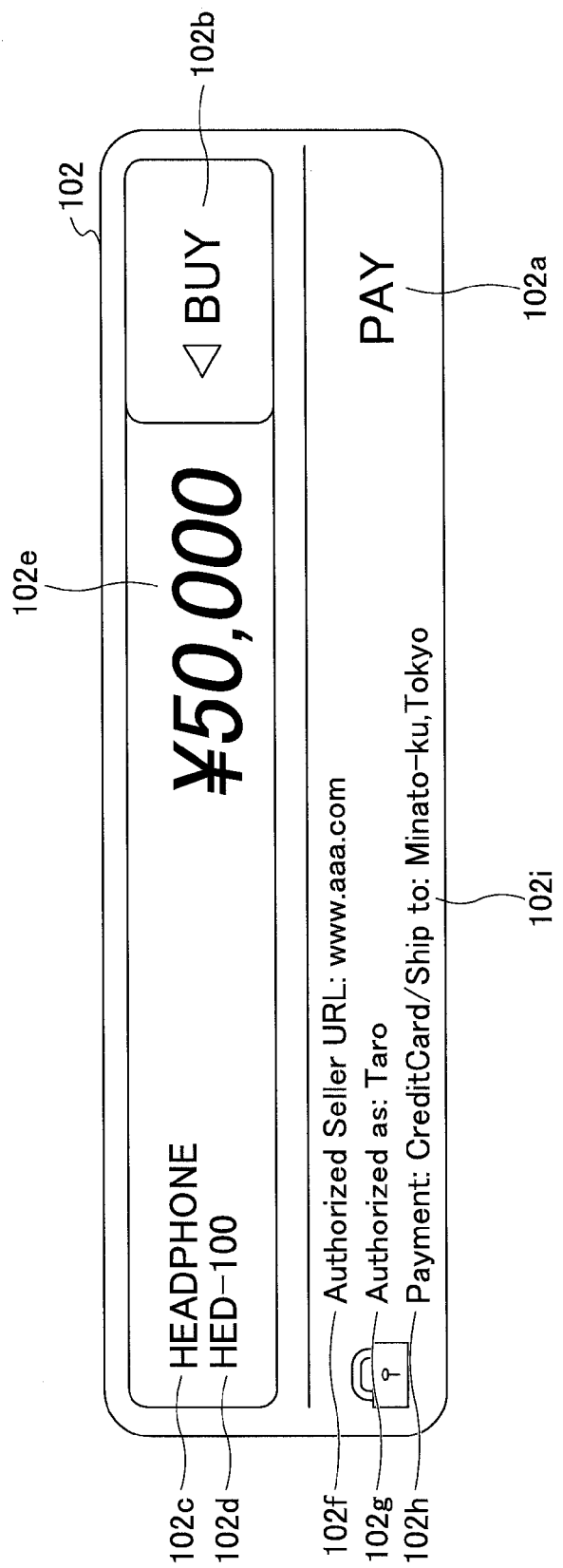
FIG. 11 is a view illustrating an example of a payment icon 102.

FIG. 11 is a view illustrating an example of the payment icon 102 of the embodiment.

The payment icon 102 of the embodiment is a banner icon and further, from displays of "PAY" 102a, an operation component 102b and the like, a user can intuitively recognize that a payment of the merchandise can be performed by a swiping operation.

Further, following information are displayed (presented) in the payment icon 102 of the embodiment.

A merchandise name 102c is name of the merchandise to be paid, and matches the merchandise sold in the merchandise page.

A merchandise model number 102d is a model number of the merchandise to be paid, and matches the model number of the merchandise sold in the merchandise page.

A price 102e is a price of the merchandise to be paid, and matches the price of the merchandise sold in the merchandise page.

An EC site (URL) 102f is a URL of the EC site joined in the settlement substituting service. This matches and corresponds to an EC site domain that sells the merchandise. With this, a fact that the EC site is a proper authenticated seller can be shown to the user.

A user name 102g is name of the user joined in the settlement substituting service. This matches a name of the user who accesses the merchandise page using the user terminal 2. With this, a fact that the user is being logged-in, in other words, user identification can be shown to the user. Here, in light of privacy or security, the user name 102g may not be a full-name or the like, and may be information at least recognized by the user.

A payment method 102h is a default payment method. For example, when the credit card payment is registered as a normal payment method, credit card information is displayed here. In light of privacy or security, only a part of the credit card information (for example, the kind of the card, the last few digits of the card number or the like) may be displayed.

A receiver's address 102i is a default merchandise receiver's address. In light of privacy or security, only a part of receiver's address information (for example, prefecture, city, town and village or the like) may be displayed.

As described above, upon specifying the EC site, the merchandise and the user, the payment server 3 generates the payment icon 102 corresponding to the specified EC site, the merchandise and the user. Thus, specifically, the payment server 3 refers to the session management DB 205a and specifies the user ID corresponding to the session ID received from the EC server 1 (see FIG. 4, for example). Then, the payment server 3 refers to the user DB 205c and obtains user information of the specified user ID (see FIG. 6, for example). With this, the user information may be reflected to the user name 102g, the payment method 102h and the receiver's address 102i in the payment icon 102.

Further, the payment server 3 refers to the EC site/merchandise DB 205b and obtains merchandise information corresponding to the "merchandise ID" received from the EC server 1 and the "EC site (URL)" (see FIG. 5, for example). With this, the merchandise information may be reflected to the merchandise name 102c, the merchandise model number 102d, the price 102e and the EC site (URL) 102f in the payment icon 102.

The above described presented information are just an example. Other information capable of being obtained from the user DB 205c and the EC site/merchandise DB 205b may be displayed in the payment icon 102.

S38: Referring back to FIG. 10, when the user wants to purchase and pay for the merchandise sold in the merchandise page 100-3, the user can pay for the merchandise by operating the payment icon 102 in the merchandise page 100-3.

FIG. 12 is a view (first) illustrating an example of a payment operation of the embodiment.

When the user wants to purchase the merchandise sold in the merchandise page 100-2, first, the user taps the operation component 102b in the payment icon 102 and performs a swiping operation of sliding in a leftward direction. When the operation component 102b is fully slid, a confirmation window, for improving security, is displayed. The user confirms whether to proceed with the payment of the merchandise by confirming the content and pressing "OK" if there is no problem (here, the confirmation may be performed by inputting a password when the merchandise is especially expensive). The payment operation is completed.

When the payment is normally completed, the payment icon is changed from the payment icon 102 to a payment icon 102-2. In the payment icon 102-2, information 102j regarding the completion of the payment is displayed. Further, buttons such as "View Order" 102k for referring to or changing detailed information of the payment, "Cancel" 102l for cancelling the payment or the like may be displayed. Links to respective member screens are embedded in these buttons and the user can refer to or update the detailed information of the payment or cancelling the payment from the member screens, respectively.

Here, conventionally, an improper operation inducement so-called a "clickjacking" or the like is known. For the "clickjacking", for example, a button desired to be operated (pressed) by the user is made transparent and set in the web page, and a dummy button such as "click here" or the like is set in a background of the page. Thus, although the user intends to press the "click here", actually, the user unknowingly clicks the transparent button. When the transparent button is a button for a payment or an order, the user may be caught in an accident of receiving merchandise for which the user did not intend to order.

With this regard, in this embodiment, the operation component 102b in the payment icon 102 is designed to be operated by a swiping operation (referred to as a "swiping payment"). By substituting the decision of the payment by the user with the swiping operation, there are merits such as error operations can be prevented, the user can be prevented from unwillingly buying merchandise because the frame is made transparent (preventing improper payment) and modification of important information such as a price or the like can be made hard to be performed.

The swiping payment is just an example. The payment operation of the user can be, of course, performed by various operations such as tapping (double), clicking (double), drawing a predetermined arc, drawing a user's signature, other specific operations, new operations or the like.

Figure 13:
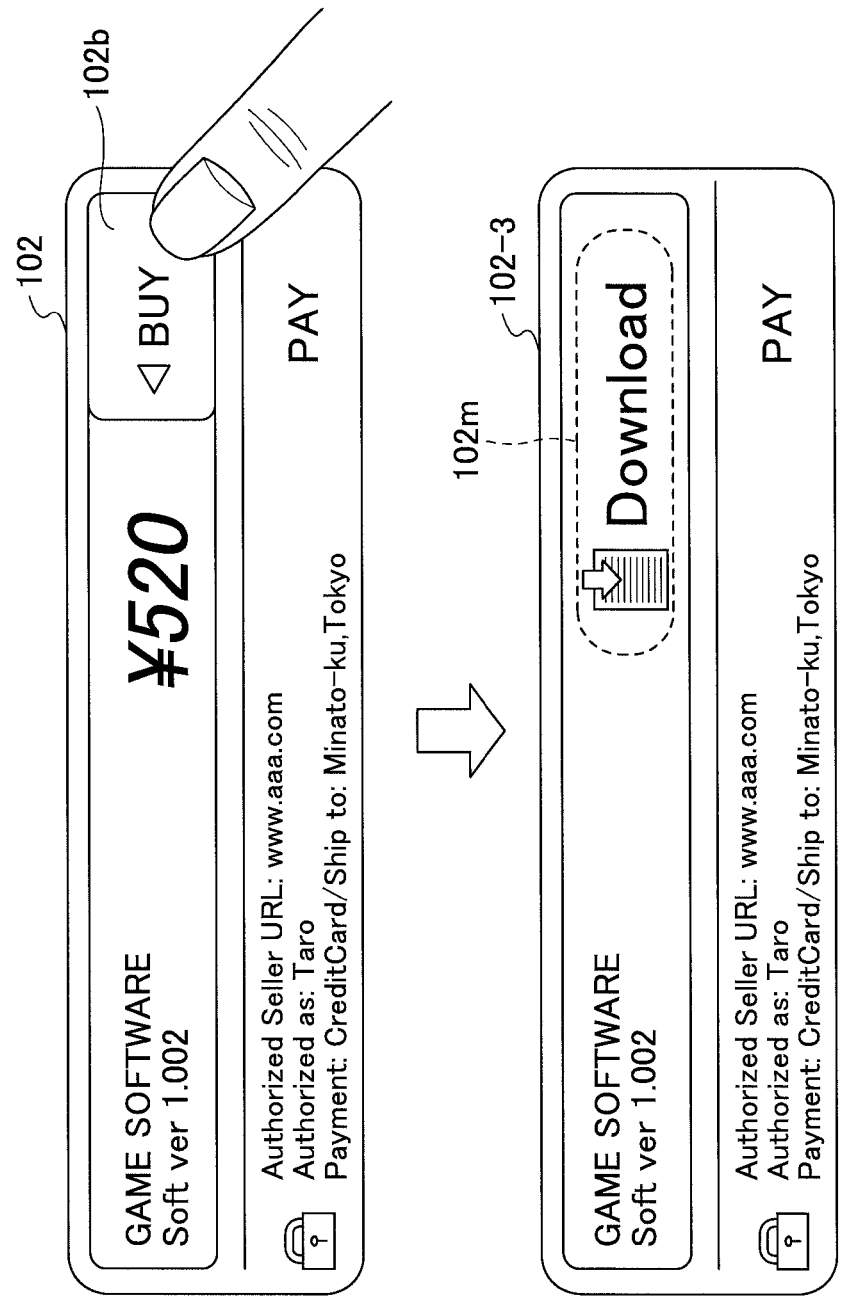
FIG. 13 is a view (second) illustrating an example of the payment operation.

FIG. 13 is a view (second) illustrating an example of the payment operation of the embodiment. When the merchandise to sell is, for example, an application program (software) or the like capable of being downloaded, the payment icon is changed from the payment icon 102 to a payment icon 102-3 after the payment is normally completed. In the payment icon 102-3, a button "Download" 102m for downloading the application program is displayed. A link to the application program is embedded in the button and the user can download the application program by this button.

S39: Referring back to FIG. 10, when the payment icon 102 in the merchandise page 100-3 is operated by the user, the payment server 3 (payment unit 204) receives this operation as a payment request and performs a payment process of the merchandise for the user specified by the session ID.

S40: After completing the payment process of the merchandise, the payment server 3 (the payment unit 204) changes the payment icon 102 in the merchandise page 100-3 to the payment icon 102-2 in a merchandise page 100-4 via the payment icon generation unit 203. With this, information 102j regarding the completion of the payment is displayed in the payment icon 102-2 (see FIG. 12, for example). With this, the merchandise payment (purchase of the merchandise) for the user is completed. After the completion of the merchandise payment, the merchandise price is paid to the EC site (selling trader) from the settlement substituting trader operating the payment server 3 and the purchased merchandise is sent to the user.

Figure 14:
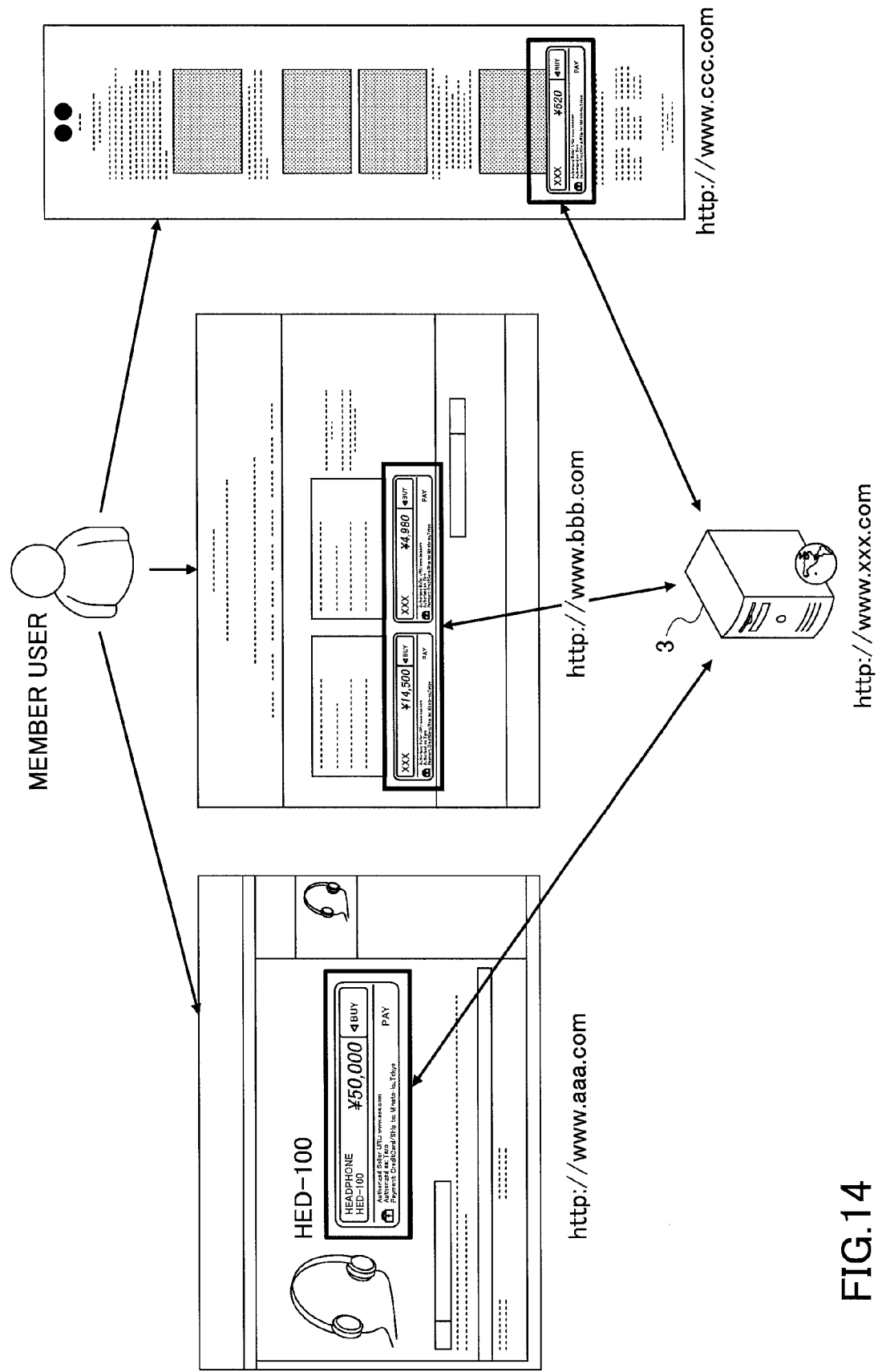
FIG. 14 is a view illustrating a relationship between the user, the EC site and a settlement substituting service.

FIG. 14 is a view illustrating a relationship between the user, the EC site and the settlement substituting service of the embodiment.

When the user is previously registered as a member user and logged-in, the user can perform the payment of purchasing merchandise at a plurality of member EC sites by single identity without inputting or the like of user information or the like again.

Further, the payment icon is generated at the payment server 3 side in the iframe that exists in the merchandise page. Thus, the user can purchase and pay for merchandise in a merchandise page just by simply operating a payment icon that is positioned right below the presentation of the merchandise at a timing when the user desires to "get", for example, even at the EC site to which the user first visited.

(Summary)

According to the payment system of the embodiment as described above, a payment mechanism in which the following points are improved can be provided.

(Advantage for User)

As a plurality of screen transitions are unnecessary until the completion of the payment when a user purchases merchandise or the like and pays for it, the user can easily perform the payment just by a minimum operation of operating a payment icon in a merchandise page.

Once the user registers user information at the first time, it is unnecessary for the user to register the user information for each EC site among countless EC sites.

(Advantage for Selling Trader)

The selling trader can easily introduce a payment mechanism with a low cost in their own EC site without a specific programming skill. Specifically, only a script tag is embedded in a merchandise page.

As there is no transition to another domain in accordance with the payment, a purchase can be completed in their own domain and design uniformity can be produced. This is adaptable for an EC site that gives high priority to focus on its company branding.

As the user can perform the payment by the minimum operation, increasing of orders and improvement of CVR can be expected. Further, this is adaptable for a small amount of payment (adaptable for a small amount of payment such as about a few hundred yen).

It is unnecessary to manage a credit card number or the like at the EC site side.

(Advantage for Payment Trader (Settlement Substituting Trader))

It is possible to provide a settlement substituting service to countless EC sites that sell any merchandise or the like by a single frame work of issuing a script tag in a merchandise page while providing the above advantages to the users and the EC sites.

Although a preferred embodiment of the invention has been specifically illustrated and described, it is to be understood that minor modifications may be made therein without departing from the spirit and scope of the invention as defined by the claims. The present invention is not limited to the specifically disclosed embodiments. For example, the merchandise to be paid for (merchandise or the like) in this embodiment includes, not only tangible merchandise, but any objects to be paid for such as intangible merchandise, intangible services or the like.

(Supplement)

Next, supplements, merits and demerits of the above described conventional "ASPlink type" and the "module embedded type" are described.

"ASPlink type"

(Merits)

The selling trader can easily introduce a settlement system with a low cost in their own EC site just by setting a link to a payment screen site operated by a settlement substituting trader side.

As a payment is performed at the payment screen site operated by the settlement substituting trader side, it is unnecessary for a user to register user information for each EC site once the user registers the information at the first time.

It is unnecessary to manage a credit card number or the like at the EC site side.

(Demerits)

A plurality of screen transitions such as a payment screen site or the like operated by the settlement substituting trader side occur until a completion of the payment when a user purchases merchandise or the like and pays for it.

It is difficult to complete a purchase to a payment in their own domain, or produce design uniformity as the payment is performed at a payment screen site operated by the settlement substituting trader side. This is not adaptable for an EC site that gives high priority to focus on its company branding.

"Module Embedded Type"

(Merits)

Selling traders can complete a purchase in their own domains, or can produce design uniformity as the settlement system can be embedded in their own EC sites.

(Demerits)

As it is necessary to embed a settlement system in their own EC site, a certain level of programming skill and a cost are necessary compared with the "ASPlink type".

A plurality of screen transitions such as a list in the shopping cart screen, a payment screen or the like occur until a completion of a payment when a user purchases merchandise or the like and pays for it.

A user has to register user information for each EC site when the user first uses the EC site.

As processes to a completion of a payment are troublesome, it is said this type is not appropriate for a small amount of payment such as about a few hundred yen.

According to the embodiment, a payment mechanism is provided in which usability in processes to a payment is improved.

What is claimed is:

1. A payment apparatus that settles merchandise sold at an Electronic Commerce (EC) site provided by an EC server, comprising:

a session management unit that manages a log-in user of the payment apparatus by session data between a user terminal of the log-in user and the payment apparatus, the session data identifying the log-in user and being stored in the user terminal;

an issuing unit that issues a script tag to be embedded in a merchandise page of a merchandise at the EC site displayed at a user terminal of a user, the script tag including a merchandise identifier for specifying the merchandise and being configured to send the merchandise identifier and session data of the user, to the payment apparatus from the EC server when the merchandise page is accessed by the user through the user terminal and the session data is obtained from the user terminal;

a generation unit that generates, upon receiving the merchandise identifier and the session data from the EC server, a payment icon for the user to pay for the merchandise by specifying the merchandise in the merchandise page based on the merchandise identifier and specifying the user who accessed the merchandise page based on the session data, the payment icon corresponding to the user and the specified merchandise;

a sending unit that sends the payment icon to the EC server so that the payment icon is displayed in the merchandise page; and a payment unit that performs, when the payment icon displayed in the merchandise page is operated by the user through the user terminal, a payment process of the merchandise for the user specified by the session data.

2. The payment apparatus according to claim 1, wherein the payment icon includes an operation component capable of being swiped, and wherein the payment unit performs the payment of the merchandise when the operation component included in the payment icon is swiped.

3. The payment apparatus according to claim 1, wherein the information for the user to pay for the merchandise includes at least one of a name or a model number of the merchandise, a payment price of the merchandise, selling trader information of the merchandise and user information of the user specified by the session data.

4. A non-transitory computer-readable recording medium having recorded thereon a payment program that causes a computer that settles merchandise sold at an Electronic Commerce (EC) site provided by an EC server, to execute functions comprising:

a session management function that manages a log-in user of the payment apparatus by session data between a user terminal of the log-in user and the payment apparatus, the session data identifying the log-in user and being stored in the user terminal;

an issuing function that issues a script tag to be embedded in a merchandise page of a merchandise at the EC site displayed at a user terminal of a user, the script tag including a merchandise identifier for specifying the merchandise and being configured to send the merchandise identifier and session data of the user, to the payment apparatus from the EC server when the merchandise page is accessed by the user through the user terminal and the session data is obtained from the user terminal;

a generation function that generates, upon receiving the merchandise identifier and the session data from the EC server, a payment icon for the user to pay for the merchandise by specifying the merchandise in the merchandise page based on the merchandise identifier and specifying the user who accessed the merchandise page based on the session data, the payment icon corresponding to the user and the specified merchandise;

a sending function that sends the payment icon to the EC server so that the payment icon is displayed in the merchandise page; and a payment function that performs, when the payment icon displayed in the merchandise page is operated by the user through the user terminal, a payment process of the merchandise for the user specified by the session data.

5. An Electronic Commerce (EC) server that causes a payment apparatus to settle merchandise sold at an EC site provided by the EC server, comprising:

a sending unit that sends, when a merchandise page of a merchandise at the EC site displayed at a user terminal of a user, in which a script tag including a merchandise identifier for specifying the merchandise issued by an issuing unit of the payment apparatus is embedded, is accessed by a user and session data identifying a log-in user of the payment apparatus is obtained from the user terminal, the merchandise identifier and the session data to the payment apparatus in accordance with the script tag embedded in the merchandise page;

a receiving unit that receives a payment icon including information for the user to pay for the merchandise from the payment apparatus to be displayed in the merchandise page, the payment icon corresponding to the user and the specified merchandise; and a requesting unit that requests, when the payment icon displayed in the merchandise page is operated by the user through the user terminal, a payment process of the merchandise for the user specified by the session data to the payment apparatus.

* * * * *